United States Patent [19]
Gusev

[11] 3,906,607
[45] Sept. 23, 1975

[54] DEVICE FOR RELATIVE ORIENTATION OF PARTS

[76] Inventor: Alexei Alexeevich Gusev, ulitsa Festivalnaya, 24, kv. 139, Moscow, U.S.S.R.

[22] Filed: Sept. 5, 1974

[21] Appl. No.: 503,325

[52] U.S. Cl. .................. 29/200 P; 29/283; 269/52; 269/266
[51] Int. Cl.² ........................................ B23P 19/00
[58] Field of Search .......... 29/200 P, 283, 148.4 A; 269/266, 52

[56] References Cited
UNITED STATES PATENTS
3,604,700  9/1971  Gault ........................... 269/266 X
FOREIGN PATENTS OR APPLICATIONS
120,214  9/1970  Norway .......................... 269/266

Primary Examiner—C. W. Lanham
Assistant Examiner—Victor A. DiPalma
Attorney, Agent, or Firm—Lilling & Siegel

[57] ABSTRACT

A device has a composite mandrel assembled of separate independently movable members, such as of telescopically joined tubes. Each tube is spring-loaded in the direction of contact of the mandrel with parts to be oriented. During the successive contact of the composite mandrel with the parts being oriented each part, while cooperating with one of the tubes of the mandrel depending on its size (diameter of the part), is positioned strictly coaxially with the common axis of the mandrel which represents the axis of orientation of a group of parts. The device is suitable both for the assembly and for oriented feeding of parts of different diameter and shape.

7 Claims, 12 Drawing Figures

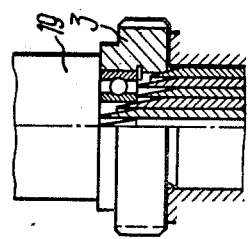
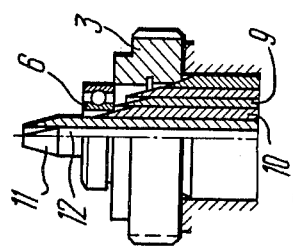
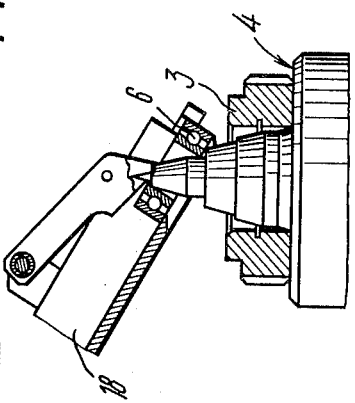
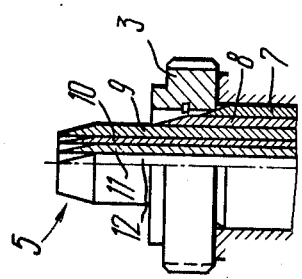
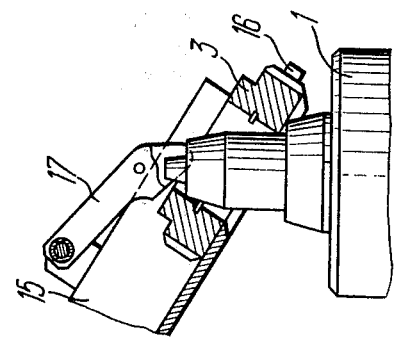

DEVICE FOR RELATIVE ORIENTATION OF PARTS

The present invention relates to the equipment for the assembly purposes in the machine building, instrumentation and watch-making industries and is mainly to be used as one of the basic units of assembly machines, for instance in the feeding and orienting arrangements operating in combination with conveyors, testing and measuring apparatus or machine tools.

It is known to employ in the above-mentioned production processes various types of auxiliary equipment for orientation of parts, such as glides, jigs, mandrels and the like. Thus, known in the art is a device for relative orientation of parts during assembly comprising a reference surface for placing the parts thereon and a mandrel defining the position of the parts with respect to the reference surface and relative each other. The mandrel has an axis extending along the common axis of orientation of parts (c.f. U.S. Pat. No. 3,095,344, Cl.156–566).

One of the most important disadvantages of such a device for relative orientation of parts consists in that this device is suitable for positioning prior to the assembly the parts having strictly defined shape and size only. In addition, the orientation is possible only where there are large plays for the assembly of parts.

It is an object of the present invention to provide a device for relative orientation of parts which is versatile in use and can be employed for orienting parts of various shape and size with the only provision being that their relatively coaxial elements might by inscribed in a circle.

It is also an object of the invention to provide a device for relative orientation of parts with any amount of play and even with an interference fit between the mating portions thereof.

Still another object of the invention is to provide the device of the above-described character for relative orientation of parts which ensures an improved accuracy of orientation of parts and respectively improved quality of a composite article being assembled.

Further object of the invention is to provide a device for relative orientation of parts which permits considerable improvement in the productivity of the assemblying or similar operations due to the reduction of time generally spent for readjustment of the orientation device and equipment associated therewith.

It is also an object of the invention to provide a device for the above-described purposes which permits, in principle, complete automation of the assembly of units in the conditions of the modern mass and series production.

Among other objects of the invention it should be noted the provision of a device for relative orientation of parts which is adaptable to changing conditions of the production process in assembling units from parts having different shapes, size and mating fits without using any additional adapters or programmed systems.

Still another object of the invention is to provide a device for relative orientation of parts which allows one to impose less stringent requirements on the accuracy of action of transportation arrangements and other kinds of production equipment associated therewith so that the quality of the articles being assembled would depend on the performance of the orienting device only.

And finally, it is an object of the invention to achieve both high effectivity of the assembly operations due to the employment of the novel device and improved quality of matching the parts in assemblies.

According to the present invention, the above and other objects are accomplished due to the fact that a device for relative orientation of parts to be positioned concentrically and each having at least one element coaxial with respect to a common orientation center, comprising a reference surface for placing the parts thereon and a mandrel defining the position of the parts with respect to the reference surface and relative each other, said mandrel having an axis extending along the common axis of orientation of parts, is characterized in that said mandrel comprises independent component members adjoining each other, each member being independently movable along the orientation axis, spring-loaded in the direction towards the parts being oriented and having at its leading end an inclined portion capable of cooperating with said coaxial element of the part so as to orient it along the common axis.

This embodiment of the device makes it versatile when employed for orientation of parts of different shape and size having the mating coaxially positioned elements comprising a circle or a figure inscribable in a circle.

In accordance with another embodiment of the invention, the device is characterized in that the mandrel comprises an assembly composed of telescopically joined tubes whose leading ends contacting with the coaxial elements of parts are provided with tapers which slide over the part concurrently with the positioning of the part along the common axis.

This improvement is, in turn, the most technologically convenient and optimal embodiment of the device suitable for orientation of parts over a wide range of shapes and sizes.

Still another embodiment of the invention involves the features, wherein the device is characterized in that each member of the mandrel is independently spring-loaded in the direction of contact with the part being oriented.

In particular, this improvement enables a permanent urging of the members of the mandrel in the direction of contact with the parts being fed for orientation.

In accordance with a further embodiment of the invention, the device is characterized in that, in case of orienting parts with reference to the inner coaxial members thereof, the diameter of the largest member of the mandrel is greater than the diameter of the largest hole of the parts being oriented, the diameter of the central member of the mandrel is smaller than the diameter of the smallest opening of the parts being oriented, and the projection of the mandrel from the reference surface is greater than the total height of the two largest parts.

These dimensional limitations permit to guarantee the versatility of the device for orientation of parts of different size.

Still another embodiment of the invention involves the feature according to which the mandrel is so assembled that, upon the leading portion thereof contacting the first part of the group of parts being oriented, at least one member of the mandrel, which is spring-loaded, advances into the mating engagement with one coaxial element of the part, and upon feeding of the next part, another independent tube of the mandrel will come in contact with the coaxial element thereof so as to ensure the relative orientation of the parts fed.

It is the above-described conditions of the assembly of the device according to the invention, that provides for regular successive engagement of the mandrel tubes with the parts of the group being assembled for relative orientation thereof.

And finally, still another embodiment of the invention contemplates the device characterized in that the telescopically joined tubes of the mandrel embrace the parts over the outer cylindrical surfaces thereof upon contacting them, the walls of each tube being provided with radially spring-loaded stops for preliminary alignment of the part being oriented.

This embodiment of the invention is intended for orientation of parts with reference to their outer coaxial elements.

The invention will now be described with reference to specific embodiments thereof illustrated in the accompanying drawings, in which:

FIG. 2 shows the device for relative orientation of parts with reference to the inner surfaces at the moment of aligning a pinion;

FIG. 3 shows the device for relative orientation of parts with reference to the inner surfaces at the moment of aligning a bearing;

FIG. 4 shows the device for relative orientation of parts with reference to the inner surfaces during the introduction of the mandrel into the pinion;

FIG. 5 shows the device for relative orientation of parts with reference to the inner surfaces during the introduction of the mandrel into the bearing;

FIG. 6 shows the device for relative orientation of parts with reference to the inner surfaces at the moment of the completion of press fitting of the bearing into the pinion;

Several embodiments will be described for a device for relative orientation of parts.

Referring to the first embodiment, the device for relative orientation of parts is mainly suitable for coaxially positioning such parts as pinions, bushes, casings and the like which have through holes so that each part is to be oriented along such a hole.

Figure 1:
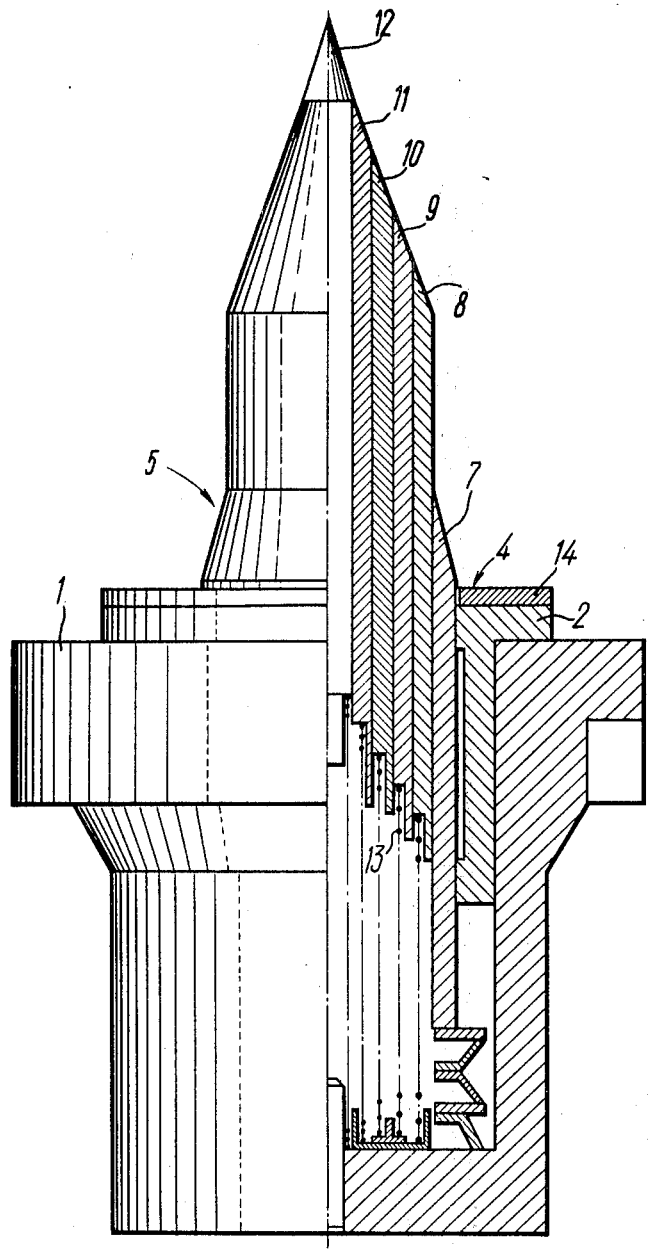
FIG. 1 shows a general view of a device for relative orientation of parts with reference to the inner surfaces.

For that purpose, the device for relative orientation of parts comprises a reference surface 4 which belongs to the housing 1 or to a reference part 2 used instead thereof, the reference surface serving for placing the first part to be oriented thereon (in this example — a pinion 3), and a mandrel 5 (FIGS. 1, 2).

The mandrel 5, together with the reference surface 4, defines the position of the pinion 3, and if necessary, the position of the next part to be oriented — a bearing 6 (FIG. 3) by means of one coaxial element of each of these parts. Such elements of the pinion 3 and the bearing 6 may be represented by cylindrical or conical holes and chambers of these holes to be positioned along the common axis of orientation.

The mandrel 5 (FIGS. 1, 2, 3) comprises independent component members — tubes 7, 8, 9, 10, 11 mating each other with a slide fit, and the central member comprises a center. The members in the form of tubes 7, 8, 9, 10, 11 and the center 12 are made of machine steel, subjected to a heat treatment and provided with hard chromium plating. Each of the tubes 7, 8, 9, 10, 11, as well as the center 12 are spring-loaded in the direction towards the parts being oriented i.e., towards the pinion 3 and the bearing 6 by means of springs 13, respectively. The tubes 7, 8, 9, 10, 11 and the center are provided at the leading end thereof with an inclined portion (normally, it is a taper with an angle of 60°–70° at the apex).

The presence of the taper ensures the alignment required for orientation and the displacement of the pinion 3 along the reference surface 4, as well as the alignment of the bearing 6 along the common axis thereof.

This ensures a predetermined relative position of the pinion 3 and the bearing 6 required for their automatic assembly.

It should be noted that the diameter of the largest tube 7 of the mandrel 5 should be greater than the diameter of the hole of any one of the pinions 3 to be oriented, and the diameter of the central member 12 should be smaller than the diameter of the smallest of the holes of the bearings 6. The projection of the center 12 of the mandrel 5 from the reference surface 4 should be greater than the height of the both largest pinion 3 and bearing 6 so as to provide enough free space for accommodation therein of one part being oriented — the bearing 6 over the other part — the pinion 3.

The height of the housing 1 should be sufficient for accommodation of the retracted set of the mandrels 5 and compression springs 13, that is it should be at least equal to the projection of the mandrels 5. If the pinion 3 is too light to compress the springs 13, there should be provided a magnetic plate 14 mounted on the end face of the housing 1 or reference part 2 so as to ensure the reliable orientation of the pinion 3. The bottom wall of the housing 1 should be parallel with respect to the reference surface 4, while the housing itself should be sufficiently solid for taking up the load during the press fitting of the bearing 6 into the pinion 3. For conveniency of the manufacture and effectivity of the device for relative orientation of parts, the housing 1 is preferably shaped as a body of revolution. Generally, the housing 1 should be manufactured of a high-tensile machine steel.

One of the above-described devices for relative orientation of parts mounted on a conveyor a rotary table, or rotor of a rotary machine is moved towards a trough 15 (FIG. 4) containing the pinions 3.

During the movement, the spring-loaded members — tubes 7, 8, 9, 10, 11, 12 of the mandrel 5 are retracted when cooperating with the lower part of the inclined trough 15. During a further movement, a part of the members — the tubes 8, 9, 10, 11, 12 pass through a slot of the trough 15 and enter, under the action of precompressed springs 13, into the hole of the pinion 3 which is aligned by means of spring catchers 16 and is urged down by means of a weight 17 located thereover. The pinion 3, together with the mandrel 5, moves while overcoming the resistance of the catchers 16 and weight 17; the pinion is supported on the reference surface 4 of the housing 1 and oriented along the axis of the mandrel 5 by means of the leading tapered end of the member 7 of the mandrel 5 (FIG. 2). In this position, the pinion 3, together with the mandrel 5, is fed to the next trough 18 (FIG. 5) containing the bearings 6 which is located above the preceding trough 15 with a vertical spacing at least equal to the highest of the preliminarily inserted pinions (FIG. 5).

This location of the trough 18 is required to ensure the movement of the mandrel 5 with the pinion 3 without an interference with the lower part of the inclined trough 18, as well as for subsequent positioning and alignment of the bearing 6 by means of the member 10 and supporting the bearing on the member 9 which rests against the end face thereof (FIG. 3). Apart from that, the operation of the trough 18 is similar to the operation of the trough 15. Upon feeding the mandrel 5 with the pinions 3 and bearings 6 to under the upper die of a press 19 (FIG. 6) these parts are assembled. After the assembly other part can be inserted. For that purpose the projecting tubes 11, 12 of the mandrel 5 may be used. It should be noted that the assembly of parts can be effected with a guaranteed play. After the assembly operation has been completed, the assembled article is removed by using the space between the reference surface 4 of the housing 1 and the end face of the pinion 3.

The employment of the device for relative orientation of parts according to the invention makes it possible to utilize high-speed automatic assembly machines having both flexible and fixed interrelations of the stations with a conveying arrangement of any appropriate type, such as a rotary table, conveyor, intermittent or chain conveyor. The device for relative orientation of parts according to the invention is also suitable for feeding and conveying parts in other machines and machine tools.

Figures 7, 8:
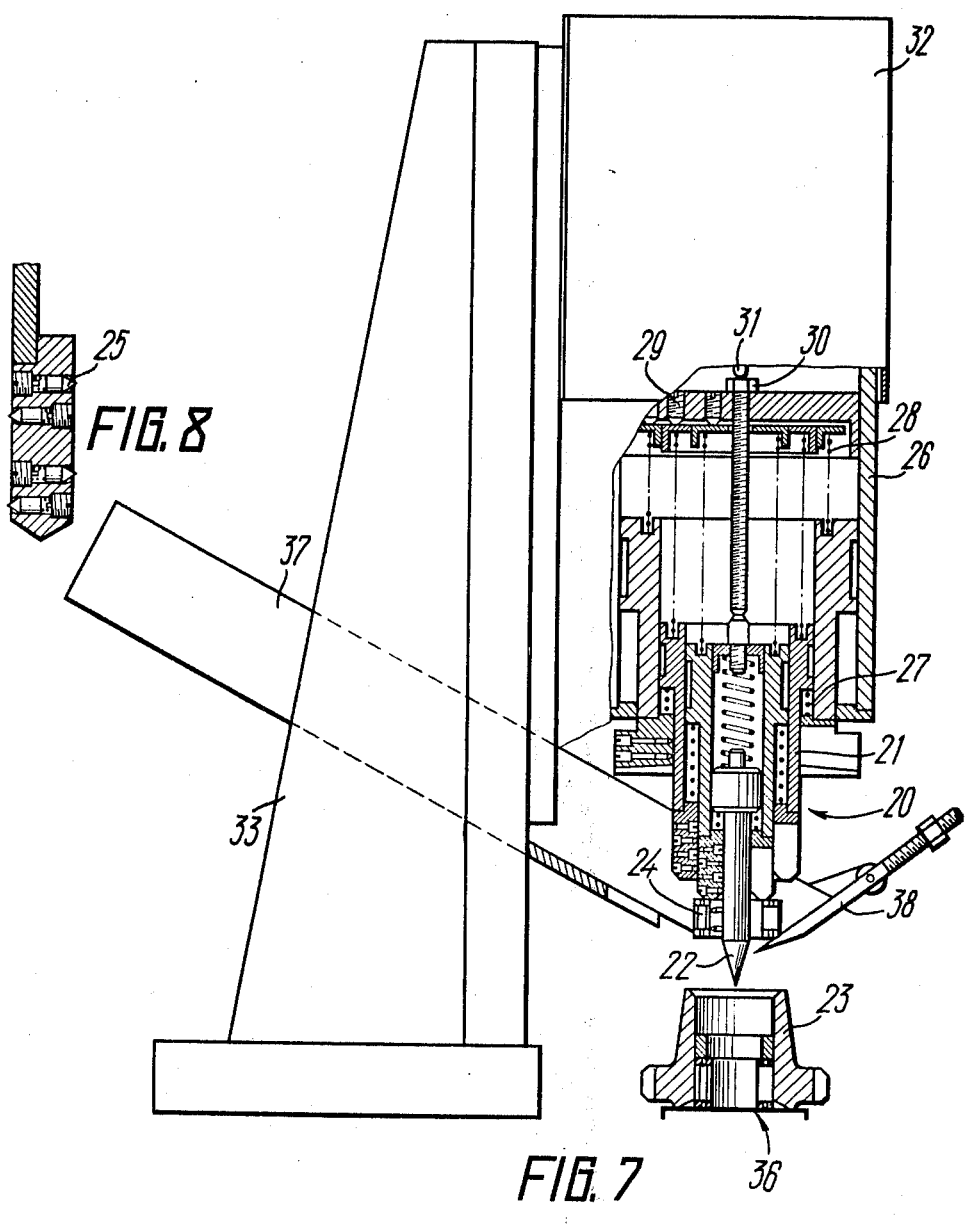
FIG. 7 shows a general view of a device for relative orientation of parts with reference of the outer surfaces.
FIG. 8 shows a partial view of the mandrel of the device for relative orientation of parts with reference to the outer surfaces.

A modification of the device for relative orientation of parts described hereinabove is shown in FIG. 7. The distinguishing feature of this device for relative orientation of parts consists in the fact that a mandrel 20 comprises an assembly composed of telescopically joined tubes 21 and a center 22, both the tubes and center being provided at the leading end thereof with tapers on the outer or inner cylindrical surface which are made as tapered chamfers with an angle of 10° – 15°. Every tube 21 and the center 22 are independently spring-loaded in the direction of contact with a pinion 23 and a needle bearing 24 being oriented. In addition, in order to ensure a preliminary alignment of the pinion 23 and needle bearing 24, the walls of the tubes 21 and of the center 22 are provided with radially spring-loaded stops 25 (FIG. 8).

The mandrel 20 (FIG. 7) composed of the telescopically joined spring-loaded tubes 21 and the center 22 is mounted in a housing 26 made of a heat-treated machine steel provided with a hard chromium plating. The tubes 21 and the center 22 are retained from falling out by means of springs 27. The force of springs 28 is adjusted by means of screws 29 and an adjustment screw 30, the end face of the latter cooperating with a piston rod 31 of an actuating jack 32 mounted on a column 33.

Figure 12:
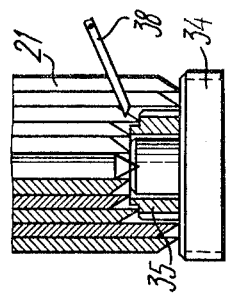
FIG. 12 shows the position of components of the device for relative orientation of parts with reference to the outer surfaces at the moment of the completion of the assembly of the composite gear.
Figure 11:
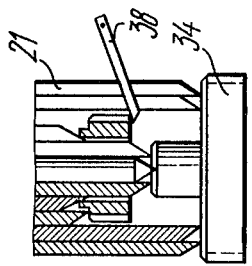
FIG. 11 shows the position of components of the device for relative orientation of parts with reference to the outer surfaces during the press fitting of the hub of the composite gear.
Figure 10:
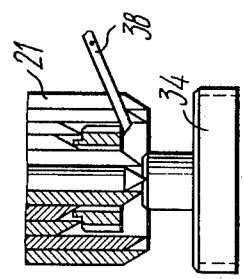
FIG. 10 shows the position of components of the device for relative orientation of parts with reference to the outer surfaces during the alignment of hub and rim of the composite gear.
Figure 9:
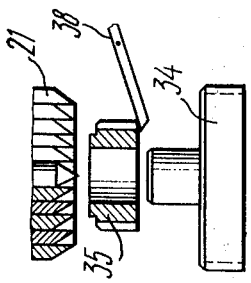
FIG. 9 shows the position of components of the device for relative orientation of parts with reference to the outer surfaces at the initial period of the assembly of a composite gear.

The device operates as follows:

In assemblying the articles, such as composite gears comprising a hub 34 (FIGS. 9–12) and a rim 35, the hub 34 is preliminarily placed on a reference surface 36 (FIG. 7), which belongs to a conveyor or machine tool, while the rim 35 is in a trough 37 wherein it is held by means of three catchers 38 (FIGS 9–12)1 Upon feeding air or liquid under operating pressure into the chamber of the actuating jack 32 (FIG. 7), the piston rod 31 of the actuating jack 32 acts on the end face of the screw 30 to move the set of mandrels 20 in unison towards the rim 34 (FIGS. 9–12) held by means of the catchers 38 of the trough 37, until a part of the tubes 21 of the mandrel 20 align the rim 35 and stop against the end face thereof, while the center 22 aligns the hub 34. The remaining tubes 21, which do not encounter any resistance against their movement, will embrace the rim 35 over the outer surface thereof and will move towards the end face of the hub 34 until they are stopped against this end face of the hub (FIG. 11). Then those tubes 21 of the mandrel 20, which have aligned (oriented) the rim 35 before hands and stopped against the end face thereof, will again start moving. These tubes 21 overcome the resistance of the catchers 38. The assembly of an article is thus affected (FIG. 12).

The assembly of the needle bearing 24 and the pinion 23 if effected in the same manner, with the only difference that in this case a part of the tubes 21 are provided with the inner tapers (FIG. 7), rather than with the outer ones (FIGS. 9 – 12), and the pinion 23 is aligned by means of these inner tapers, rather than by means of the center 22.

It should be noted that the device for relative orientation of parts having the center 22 may be also employed for centering parts.

What is claimed is:

1. A device for relative orientation of parts to be concentrically positioned relative to each other and each having at least one element coaxial with respect to a common orientation center comprising: a reference surface for placing thereon the first part of a group of parts being oriented; a mandrel defining the position of the parts with respect to said reference surface and relative to each other, said mandrel comprising independent component members adjoining each other, each member being capable of independently moving along the axis of orientation of the parts which extends along the axis of the mandrel, each of said component members of the mandrel being biased in the directon towards the zone of contact with the parts being oriented and having at its leading end a portion inclined with respect to the axis of orientation, said portion being capable of cooperating with said coaxial element of the part being oriented so as to displace this part along the inclined portion until it reaches the position in which the part is oriented coaxially with the common axis of the mandrel.

2. A device as claimed in claim 1, wherein the mandrel comprises an assembly composed of telescopically joined tubes having at their leading ends contacting the coaxial elements of the parts tapers which slide over the parts concurrently with the positioning of the parts along the common axis.

3. A device as claimed in claim 2, wherein each member of the mandrel is independently spring-loaded in the direction of contact with the part being oriented.

4. A device as claimed in claim 2, wherein, in orienting parts with reference to the inner coaxial elements thereof, the diameter of the largest member of the mandrel is greater than the diameter of the largest hole of the parts being oriented, the diameter of the central member of the mandrel is smaller then the diameter of the smallest hole of the parts being oriented, and the projection of the mandrel from the reference surface is greater than the total height of the two largest parts.

5. A device as claimed in claim 2, wherein the mandrel is assembled in such a manner that upon the leading portion thereof contacting the first part of the group of parts being oriented, at least one member of the mandrel, which is spring-loaded, advances into the mating with one coaxial element of the part, and upon feeding the next part, another independent tube of the mandrel will come into the mating engagement with the coaxial element thereof so as to ensure the relative orientation of the parts being fed.

6. A device as claimed in claim 2, wherein the telescopically joined tubes of the mandrel embrace the parts over the outer surface thereof upon contacting them, the walls of each tube being provided with radially spring-loaded stops for preliminary alignment of the part being oriented.

7. A device as claimed in claim 1, wherein each of said component members of the mandrel is spring loaded in the direction towards the zone of contact with the parts being oriented.

* * * * *